UNITED STATES PATENT OFFICE.

PAUL UHLMANN, OF DRESDEN, GERMANY, ASSIGNOR TO THE CHEMISCHE FABRIK VON HEYDEN, ACTIEN-GESELLSCHAFT, OF RADEBEUL, GERMANY.

BETA-NAPHTHOQUINONE DYE AND PROCESS OF MAKING SAME.

SPECIFICATION forming part of Letters Patent No. 653,492, dated July 10, 1900.

Application filed March 5, 1900. Serial No. 7,268. (Specimens.)

*To all whom it may concern:*

Be it known that I, PAUL UHLMANN, a subject of the King of Saxony, and a resident of Dresden, in the Kingdom of Saxony and German Empire, have invented a new and useful Improvement in the Manufacture of New Coloring-Matters from Beta-Naphthoquinone and its Derivatives, of which the following is a specification.

This invention has reference to the manufacture of new coloring-matters from beta-naphthoquinone and its derivatives.

As is known, beta-naphthoquinone and its derivatives (*e.g.*, 1.2 dioxynaphthalene and di-naphthylquinhydrone) dissolve with a green coloration in concentrated sulfuric acid. I have now observed that upon heating such solutions a change of color occurs—first to greenish black, then to blue-black, subsequently to reddish black, and finally turning through red to brown at temperatures of 120° to 230° centigrade. At the same time $SO_2$ is liberated. When a sample of the resulting product is dissolved in water and excess soda-lye, a greenish-blue and in the later stages a violet-blue solution results. The oxidation process which occurs on heating, as above described, is considerably facilitated if boracic acid be added to the solution of beta-naphthoquinone or its derivative in sulfuric acid. Upon pouring the solution into water and working up according to the usual methods the new coloring-matters are obtained either as neutral pastes or as sodium salts, which dye unmordanted wool greenish blue to brown and chromated wool or fibers with aluminum, iron, or tin mordants in dark shades ranging to black.

Instead of ordinary concentrated sulfuric acid fuming sulfuric acid may be employed for the purposes of this invention.

The following examples will serve to illustrate the invention:

Example I: Thirty kilograms beta-naphthoquinone are introduced while stirring into three hundred kilograms sulfuric acid containing about five per cent. free $SO_3$. When the beta-naphthoquinone is completely dissolved, the solution is heated to 100° centigrade, and twenty kilograms boracic acid are added while the solution is further heated to 130° centigrade. The solution, which is at first dark green, soon assumes a bluish-black shade, which later turns to a reddish black. At the same time $SO_2$ is liberated in considerable quantity. The process is complete in about one-half to one hour, when a sample poured into water supersaturated with soda-lye gives a clear bluish-green solution. The melt is poured into about five thousand liters of water, pressed, and the separated dyestuff brought to utilizable condition by washing in cold water and then with dilute soda solution, then again with water, until the washing-waters give a neutral reaction.

The proportions of boracic acid, the degree of concentration of the sulfuric acid, and the period of operation may of course vary within wide limits, the shade of the coloring-matter being influenced by the variation of these conditions.

Example II: Thirty kilograms beta-naphthoquinone are dissolved in six hundred kilograms monohydrate, ($H_2SO_4$.) The solution is heated to 80° centigrade, and thirty kilograms boracic acid are added. It is then stirred for three hours at 125° centigrade and then worked up.

Example III: The conditions and proportions remaining otherwise the same as in example II, the stirring after the addition of the boracic acid occupies seven hours and the temperature is maintained at 125° centigrade. The product is then worked up. The dyestuff becomes more brownish by reason of the longer stirring.

The black coloring-matter which is obtained by the preceding examples is slightly soluble in water, is precipitated by common salt solution, and is slightly soluble in benzene with a brown coloration, in ether brown, and in ninety per cent. alcohol violet-brown. As distinguished from naphthazarin (alizarin-black) it shows the following typical reactions:

|  | Solution with— | |
| --- | --- | --- |
|  | Naphthazarin. | Naphthoquinone-black. |
| Bicarbonate | Violet-red | Blue-black. |
| Soda | Pure blue | Greenish blue. |
| Soda-lye | ...do | Dark green. |
| Solution in concentrated $H_2SO_4$ | Fuchsin red | Blue-black. |

Having now particularly described and ascertained the nature of the said invention and in what manner the same is to be performed, I declare that what I claim is—

1. The within-described process of obtaining coloring-matters from substances containing beta-naphthoquinone, which consists in heating those bodies with sulfuric acid.

2. The within-described process of obtaining coloring-matters from substances containing beta-naphthoquinone, which consists in heating those bodies with sulfuric acid and boracic acid.

3. The new coloring-matter herein described obtained from beta-naphthoquinone, consisting of a paste of a reddish black to violet color, which is slightly soluble in water and which shows a blue-black color when added to a solution of bicarbonate, a greenish blue color when added to a solution of soda, a dark-green color when added to a solution soda-lye, a blue-black color when added to concentrated sulfuric acid, the said coloring-matter dyeing unmordanted wool greenish black and brown, and dyeing chromated wool or fibers mordanted with aluminum, iron or tin in dark shades ranging to black.

In testimony that I claim the foregoing as my invention I have signed my name, in presence of two witnesses, this 15th day of February, 1900.

PAUL UHLMANN.

Witnesses:
HERNANDO DE SOTO,
PAUL ARRAS.